United States Patent
Bouley et al.

(10) Patent No.: US 12,062,969 B2
(45) Date of Patent: Aug. 13, 2024

(54) FLUID PLANT COMPRISING AN EXPANSION SYSTEM, IN PARTICULAR FOR A GAS INSTALLATION COMPRISING AN ELECTRICITY GENERATING SYSTEM

(71) Applicant: TEREGA, Pau (FR)

(72) Inventors: Eric Maurice Marcel Bouley, Idron (FR); David Alexandre Jocelyn Carrere, Gan (FR); Octavian Flavius Curea, Anglet (FR)

(73) Assignee: Terega, Pau (FR)

( * ) Notice: Subject to any disclaimer, the term of this patent is extended or adjusted under 35 U.S.C. 154(b) by 0 days.

(21) Appl. No.: 17/782,954

(22) PCT Filed: Dec. 1, 2020

(86) PCT No.: PCT/EP2020/084038
§ 371 (c)(1),
(2) Date: Jun. 6, 2022

(87) PCT Pub. No.: WO2021/110636
PCT Pub. Date: Jun. 10, 2021

(65) Prior Publication Data
US 2023/0006511 A1    Jan. 5, 2023

(30) Foreign Application Priority Data

Dec. 6, 2019   (FR) ...................... 1913887

(51) Int. Cl.
*H02K 7/18*        (2006.01)
*F17D 1/04*        (2006.01)

(52) U.S. Cl.
CPC ............. *H02K 7/1823* (2013.01); *F17D 1/04* (2013.01)

(58) Field of Classification Search
CPC .... H02K 7/1823; F17D 1/04; F17C 2265/068
See application file for complete search history.

(56) References Cited

U.S. PATENT DOCUMENTS

| | | | |
|---|---|---|---|
| 4,677,827 A | 7/1987 | Shenoy et al. | |
| 5,628,191 A | 5/1997 | Kueck et al. | |
| 9,885,239 B2 | 2/2018 | Haider et al. | |
| 2007/0163256 A1 | 7/2007 | McDonald et al. | |

(Continued)

FOREIGN PATENT DOCUMENTS

| | | |
|---|---|---|
| FR | 3 045 726 | 12/2015 |
| WO | 2010142698 A1 | 12/2010 |

OTHER PUBLICATIONS

International Search Report and Written Opinion mailed Mar. 11, 2021, issued in corresponding Application No. PCT/EP2020/084038, filed Dec. 1, 2020, 14 pages.

*Primary Examiner* — Joseph Ortega
(74) *Attorney, Agent, or Firm* — Christensen O'Connor Johnson Kindness PLLC

(57) ABSTRACT

Disclosed is a gas plant, in particular for a gas installation, comprising an expansion system capable of converting high-pressure gas into low-pressure gas. The gas plant comprises an electricity generating system arranged in parallel with the expansion system and comprising a double-acting actuator comprising two supply ports alternately supplied with high-pressure gas, a hydraulic system connected to the double-acting actuator and configured to transform the mechanical translational energy of the actuator into mechanical rotational energy; and an electricity generator connected to the hydraulic system and configured to convert the mechanical rotational energy into electrical energy.

12 Claims, 3 Drawing Sheets

(56) References Cited

U.S. PATENT DOCUMENTS

Figure 1:
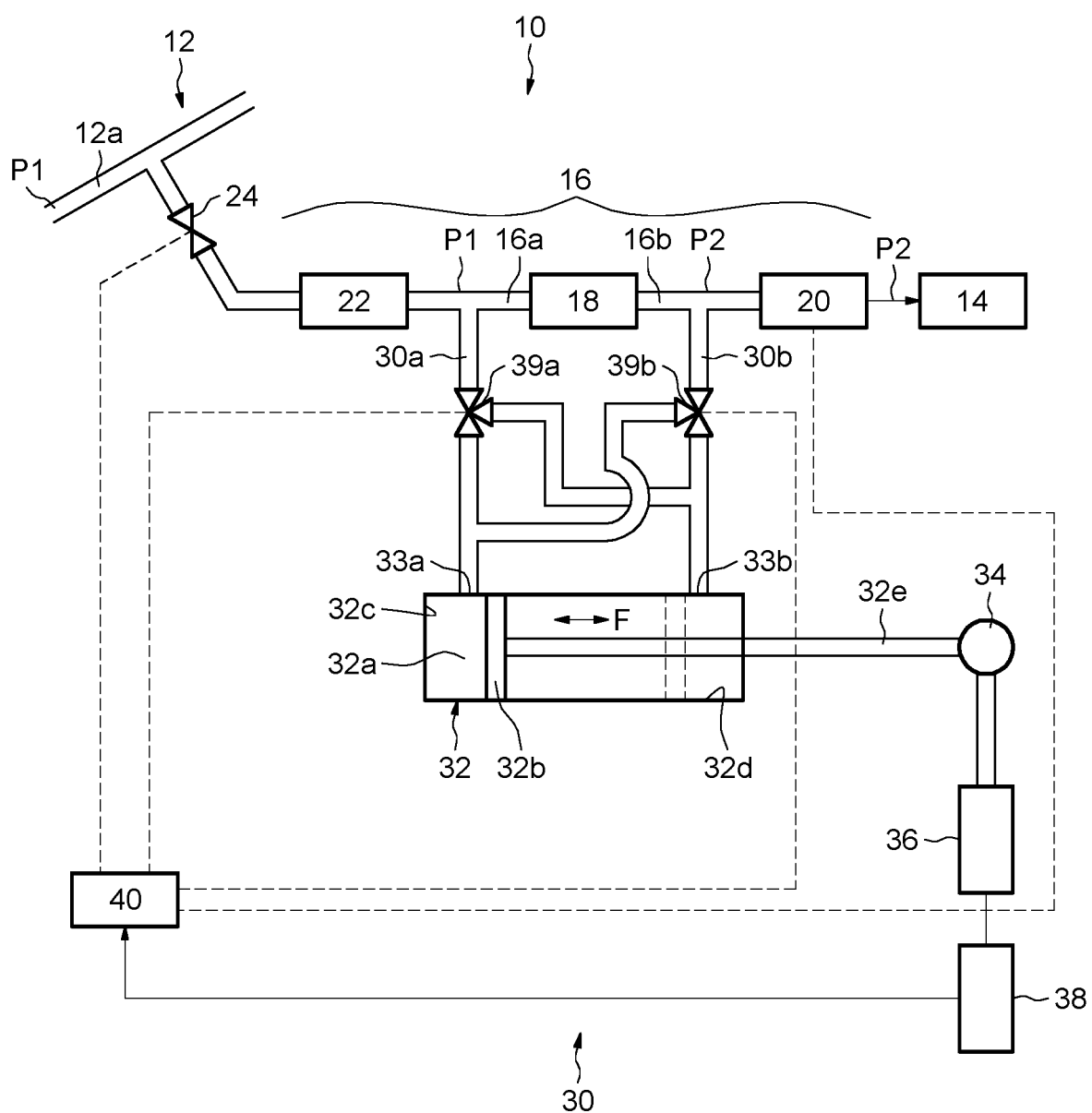

2008/0016879 A1    1/2008   Watson et al.
2019/0032853 A1*   1/2019   King .................... B67D 7/3272
2022/0049820 A1*   2/2022   Onfroy .............. H02K 11/0094

* cited by examiner

FLUID PLANT COMPRISING AN EXPANSION SYSTEM, IN PARTICULAR FOR A GAS INSTALLATION COMPRISING AN ELECTRICITY GENERATING SYSTEM

The present invention relates to the field of gas installations, and particularly natural gas installations, as well as the production of electrical energy in such a natural gas installation.

In order to transport natural gas in large amounts and over long distances, natural gas is compressed at high-pressure, in the range of 50 to 80 bar.

The natural gas distribution standards require the gas pressure to be reduced to a low-pressure in the range of 4 to 15 bars, for example equal to 4 bars, before delivery to customers.

Thus, the gas installations comprise a high-pressure natural gas transport network and plants called "delivery" plants comprising natural gas expansion systems for the purpose of distributing the natural gas to a low-pressure gas distribution network.

The gas installation generally comprises, downstream of the gas expansion system, a metering device allowing accounting for the amount of gas supplied to the gas distribution network.

Such a metering device requires a power supply which is not always present, in particular on gas installations isolated from any electrical network.

It is possible to provide a power supply to the metering device using solar panels or even wind turbines. However, such electricity generating systems are particularly expensive and theft-sensitive.

The document US 2007 163 256 is known, which describes an installation allowing reducing the pressure in a natural gas pipeline and comprising a flow rate converter and an electricity generator mechanically connected to said converter to transform the energy resulting from the pressure drop into electrical energy.

The document FR 3 045 726 is also known, which describes a device for extracting and recovering the expansion energy of a gas comprising a turbomachine including a freely rotating shaft to produce an expansion, said shaft being connected to an electric generator configured to convert the mechanical rotational energy produced by the turbomachine into electricity.

However, such systems are particularly difficult to implement and particularly expensive. In addition, such systems are intrusive and generate pressure losses, a significant drop in temperature, as well as noise pollution. Their maintenance is also relatively a difficult maintenance, There is therefore a need to supply electricity to the different systems of a fluid installation, in particular gas, in an autonomous, theft-insensitive manner, and without emitting $CO_2$ and natural gas $CH_4$ emissions.

The invention therefore relates to a fluid plant, in particular for a fluid installation, comprising an expansion system capable of converting the high-pressure fluid into low-pressure fluid.

The fluid plant can be a fluid delivery plant or another shutoff plant provided with an expansion system.

Moreover, the fluid can be any gas, preferably natural gas.

The fluid plant comprises an electricity generating system disposed in parallel with the expansion system and comprising a double-acting cylinder connected upstream of the expansion system and downstream of said expansion system and comprising two supply ports alternately supplied by the high-pressure fluid.

The electricity generating system further comprises a hydraulic system connected to said double-acting cylinder and configured to transform the mechanical translational energy of said cylinder into a mechanical rotational energy; and an electric generator connected to the hydraulic system and configured to convert the mechanical rotational energy of the hydraulic system into electrical energy.

The term "double-acting cylinder" means a cylinder with two working directions.

Thus, the electricity generating system is strictly dependent on the pressure of the fluid, for example natural gas, and therefore does not release $CO_2$ and natural gas $CH_4$ into the atmosphere.

Thanks to the electricity generating system using only gas pressure, electricity of at least 30 W, for example 100W, is generated without polluting the environment.

Advantageously, the fluid plant comprises an electronic control unit configured to supply fluid to the double-acting cylinder. Said electronic control unit being supplied with direct current by the electric generator.

The fluid plant preferably comprises an electrical energy accumulator, such as for example an electric battery, mounted downstream of the electric generator and configured to store the direct current from said generator. Thus, before the start of the electricity generating system, the electricity is transmitted by the energy accumulator which is then continuously recharged by the electric generator.

According to one embodiment, the fluid plant comprises two three-way solenoid valves controlled by the electronic control unit to alternately supply high-pressure fluid to the two supply ports of the double-acting cylinder.

According to another embodiment, the fluid plant comprises at least one multiway distribution valve movable between a position for supplying the double-acting cylinder with high-pressure fluid taken upstream of the expansion system and a position for injecting the low-pressure fluid exiting said cylinder downstream of the expansion system, said position of the distribution valve is controlled by the electronic control unit to alternately supply high-pressure fluid to the two supply ports of the double-acting cylinder.

According to another embodiment, the fluid plant comprises two multiway distribution valves movable between a position for supplying the double-acting cylinder with high-pressure fluid taken upstream of the expansion system and a position for injecting the low-pressure fluid exiting said cylinder downstream of the expansion system. Said distribution valve positions are controlled by the electronic control unit to alternately supply high-pressure fluid to the two supply ports of the double-acting cylinder.

The distribution valves are, for example, of the 3/2 type.

For example, the double-acting cylinder comprises a cylindrical cylinder casing delimiting an internal volume and a piston movable in translation in said casing and separating the internal volume into two isolated chambers, said piston being secured to a substantially rigid rod connected to the hydraulic system in order to transmit the mechanical energy of the piston to said hydraulic system.

Advantageously, the expansion system is configured to allow maintaining the pressure downstream of said system at a threshold value, for example less than or equal to 5 bars. The threshold value is defined so as to be sufficient to allow the expansion system to absorb possible overpressure.

For example, the fluid plant comprises a metering device disposed downstream of the expansion system and upstream of a low-pressure fluid distribution network, said metering device being supplied with direct current by the electricity generating system.

For example, the fluid plant comprises a high-pressure line connecting the expansion system to the transport network and a low-pressure line connecting the expansion system to the metering device.

The electricity generating system is connected to the high-pressure line, through which high-pressure fluid is taken to be injected into the double-acting cylinder, and to the low-pressure line, through which low-pressure fluid from the cylinder is injected into said low-pressure main line.

The fluid plant is for example a natural gas delivery plant.

According to one second aspect, the invention relates to a natural gas installation comprising a high-pressure natural gas transport network, for example at a pressure in the range of 40 to 80 bars, a distribution network receiving a low-pressure natural gas, for example in the range of 4 to 15 bars, preferably less than 5 bars, and intended to supply industrial infrastructures, and at least one delivery plant as previously described connecting the transport network to the distribution network.

Figure 2A:
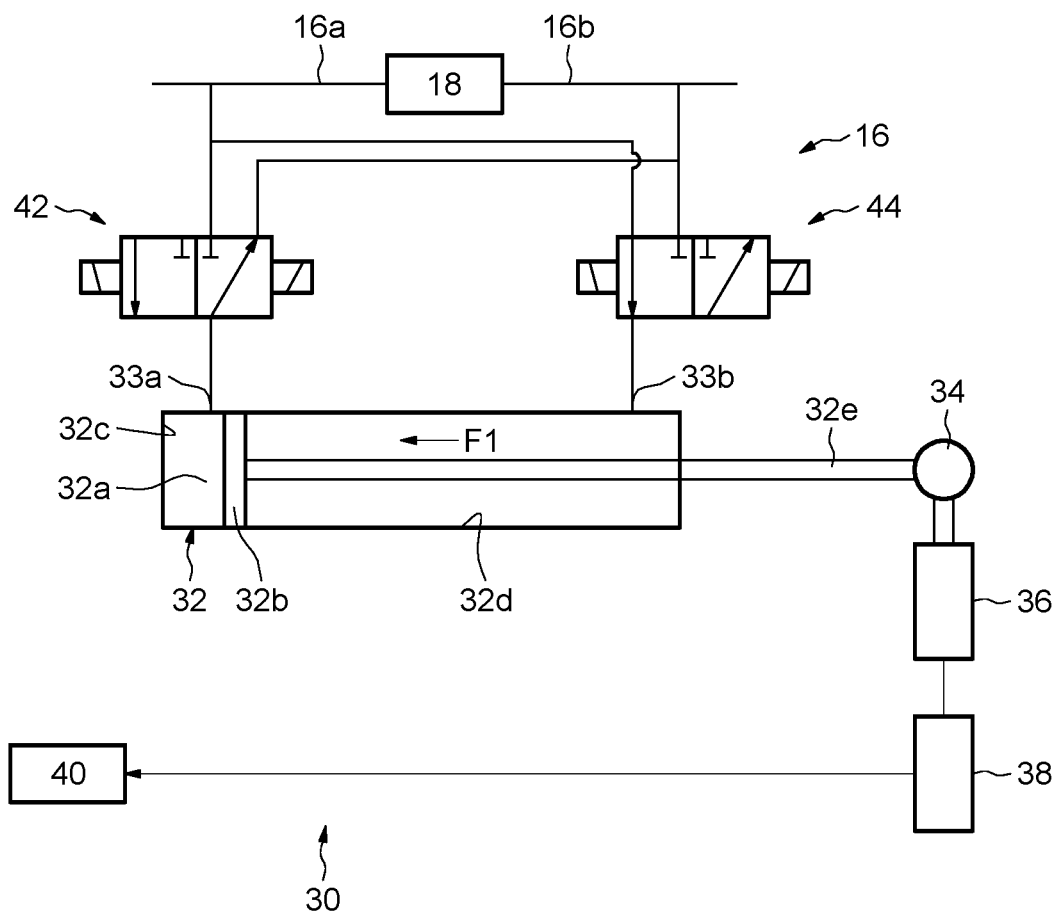
Figure 2B:
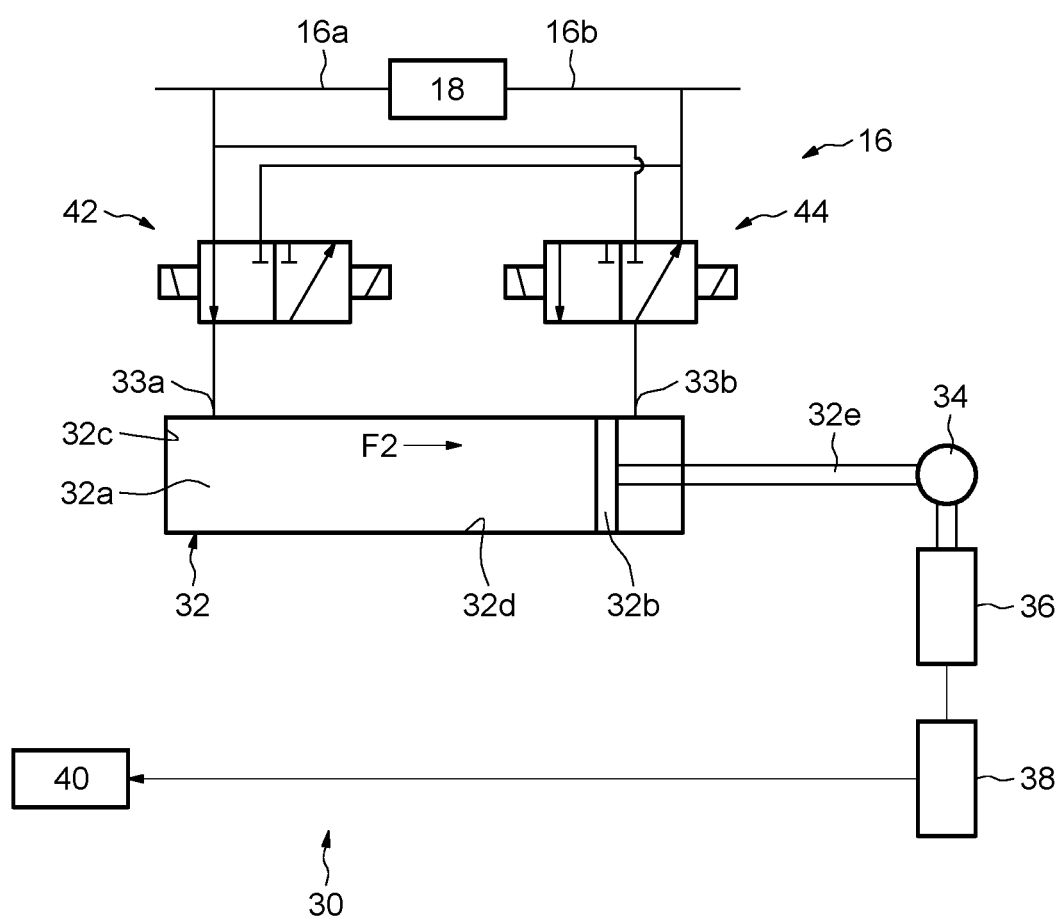

Other aims, features and advantages of the invention will appear on reading the following description, given solely by way of non-limiting example, and made with reference to the indexed drawings on which:

FIG. 1 schematically illustrates a gas installation comprising an electricity generating system according to one first embodiment of the invention;

FIG. 2A is a detail view of an electricity generating system for a gas installation of FIG. 1 according to one second embodiment, in a first position; and FIG. 2B illustrates the electricity generating system of FIG. 2A in a second position.

As illustrated in FIG. 1, a fluid installation, in particular natural gas installation, referenced 10 as a whole comprises a transport network 12 of said natural gas comprising a plurality of main lines 12a capable of containing a compressed high-pressure gas in the range of 40 to 80 bars.

The natural gas installation 10 further comprises a distribution network 14 intended to supply industrial infrastructures (not represented) for the distribution of natural gas at a low pressure P2, in the range of 4 to 15 bars, preferably less than 5 bars.

The distribution network 14 is connected to the transport network 12 by a gas plant 16, for example a gas delivery plant, configured to expand the high-pressure gas from the transport network so as to obtain a low-pressure gas.

To this end, each delivery plant 16 comprises a natural gas expansion system 18 and, downstream of said expansion system 18, a metering device 20 allowing accounting for the amount of low-pressure gas supplied to the gas distribution network 14.

The delivery plant 16 comprises a high-pressure line 16a connecting the expansion system 18 to the transport network 12 and a low-pressure line 16b connecting the expansion system 18 to the metering device 20.

The gas installation 10 may comprise, without limitation, a filter 22 disposed upstream of the expansion system 18 and a valve 24 disposed upstream of said filter 22 configured to isolate the main line 12a from the transport network 12 and from the delivery plant 16.

Each delivery plant 16 comprises an electricity generating system 30 disposed in parallel with the expansion system 18.

The electricity generating system 30 comprises a cylinder 32 called "double-acting" cylinder comprising a cylindrical cylinder casing 32a delimiting an internal volume and a piston 32b movable in translation in said casing 32a and separating the internal volume into two isolated chambers 32c, 32d.

The sealing between the chambers 32c, 32d and the piston is made by seals (not represented).

The piston 32b is secured to a rigid rod 32e connected to a hydraulic system 34 in order to transmit the mechanical energy of the piston to said hydraulic system 34. The hydraulic system 34 is configured to transform the mechanical translational energy of the piston 32b into a mechanical rotational energy.

The oil pressurised via the piston 32b drives a hydraulic motor (not represented) coupled to the direct current generator 36. The direction of rotation of said hydraulic motor is unchanged regardless of the direction of translation of the pneumatic cylinder thanks to the use of check valves (not represented).

The hydraulic vector, whose pressure is the same as that of the gas, allows guaranteeing that the electric generator is kept away from the cylinder, via the use, for example, of simple connections or hoses. This allows overcoming the constraints of the explosive atmosphere standards, of acronym ATEX, which impose constructive arrangements between the gas network and the electricity.

The hydraulic system 34 in turn transmits the created mechanical rotational energy to an electric generator 36 connected to an electric battery 38.

The term "double-acting cylinder" meant a cylinder with two working directions. Thus, the cylinder casing 32a comprises two supply orifices 33a, 33b and the pressure is alternately applied on each side of the piston 32b, which generates a translational movement of said piston following the arrow F illustrated in FIG. 1.

As illustrated in FIG. 1, the electricity generating system 30 comprises a secondary high-pressure line 30a through which high-pressure gas is taken to be fed into the double-acting cylinder 32 and a secondary low-pressure line 30b via which the low-pressure gas is injected into the main low-pressure line 16b.

A first three-way solenoid valve 39a is disposed on the secondary high-pressure line 30a in order to distribute the high-pressure gas to one or the other of the ports 33a, 33b of the cylinder.

A second three-way solenoid valve 39b is disposed on the secondary low-pressure line 30b in order to inject the low-pressure gas into the main low-pressure line 16b.

The expansion system 18 is configured to allow the regulation of the pressure P2 downstream and its maintenance at a threshold value, for example equal to 5 bars.

The electricity generating system 30 further comprises an electronic control unit 40 or an automaton configured to control the position of the solenoid valves 39a and 39b. Moreover, the electrical energy from the battery 38 allows powering the metering and remote transmission device 20 of the site.

The electricity generating system does not impact the quality of the gas on the low-pressure side, nor the gas volume. Indeed, the volume of reinjected gas is relatively small and generates little or no overpressure downstream of the expansion system.

The embodiment illustrated in FIGS. 2A and 2B differs from the embodiment of FIG. 1 only in that the supply of the double-acting cylinder 32 is done by two multiway distribution valves 42, 44. Alternatively, only one distribution valve could be provided to alternately supply the two supply ports 33a, 33b of the cylinder 32.

As illustrated, the distribution valves 42, 44 are of the 3/2 type and are movable between a position Position1 for supplying high-pressure gas and a position Position2 for injecting low-pressure gas.

FIG. 2A represents the first distribution valve 42 in the low-pressure position, that is to say that it does not allow high-pressure gas to pass to the cylinder but that it transmits the low-pressure gas from the first supply port 33a to the low-pressure main line 16b. In this figure, the second distribution valve 44 is in the high-pressure position, that is to say that it transmits high-pressure gas through the second port 33b of the cylinder 32 and that it does not allow the low-pressure gas to pass. Thus, the piston 32b is moved in translation according to the arrow F1 towards the bottom of the casing 32a of the cylinder.

FIG. 2B represents the first distribution valve 42 in the high-pressure position, that is to say that it transmits high-pressure gas through the first port 33a of the cylinder 32 and that it does not allow the low-pressure gas to pass.

In this figure, the second distribution valve 44 is in the low-pressure position, that is to say that it does not allow high-pressure gas to pass to the cylinder, but that it transmits the low-pressure gas from the second supply port 33b to the main low-pressure line 16b. Thus, the piston 32b is moved in translation according to the arrow F2 towards the inlet of the cylinder casing 32a.

By way of non-limiting example, the distribution valves 42, 44 are controlled by the electronic control unit 40. Alternatively, the distribution valves 42, 44 could be mechanically controlled by an assembly device (not represented) between the cylinder 32 and said distribution valves 42, 44.

Thanks to the double-acting cylinder, a continuous translation movement is obtained, which allows providing a mechanical energy that can be recovered by a direct current generator.

Thus, it is possible to supply electrical energy to the metering device, as well as other elements present on the delivery plant, in a theft-insensitive autonomous manner, and without emitting CO2 and natural gas CH4 emissions.

The invention claimed is:

1. A fluid plant (16) for a fluid installation (10), comprising a high-pressure line (16a) and an expansion system (18) capable of converting a high-pressure fluid into a low-pressure fluid connected to the high-pressure line (16a) and a low-pressure line (16b) downstream of the expansion system (18), wherein the fluid plant comprises: an electricity generating system (30) coupled to the high-pressure line and the low-pressure line of the expansion system (18) comprising:
   a double-acting cylinder (32) connected upstream of the expansion system (18) and downstream of said expansion system (18) and comprising two supply ports (33a, 33b) alternately supplying the high-pressure fluid;
   a hydraulic system (34) connected to said double-acting cylinder (32) configured to transform a mechanical translational energy of said double-acting cylinder into a mechanical rotational energy; and
   an electric generator (36) connected to the hydraulic system (34) and configured to convert the mechanical rotational energy into electrical energy,
   the electricity generating system (30) comprises:
   a secondary high-pressure line (30a) connected to the high-pressure line (16a) wherein a high-pressure fluid fed into the double-acting cylinder (32) via one of the supply ports (33a, 33b) and
   a secondary low-pressure line (30b) connected to the low-pressure line (16b) wherein the low-pressure fluid exits one or more the supply orifices (33a, 33b) of the double-acting cylinder (32) is injected downstream of the expansion system (18) and wherein the fluid plant comprises:
   an electronic control unit (40) configured to supply the high-pressure fluid to the double-acting cylinder (32), said electronic control unit (40) being supplied with direct current by the electric generator (36), and
   two three-way solenoid valves (39a, 39b) controlled by the electronic control unit (40) or at least one multiway distribution valve (42, 44) to alternately supply the high-pressure fluid to the two supply ports (33a, 33b) of the double-acting cylinder (32).

2. The fluid plant according to claim 1, comprising an electrical energy accumulator (38) mounted downstream of the electric generator (36) and configured to store the direct current from said generator.

3. The fluid plant according to claim 1, comprising two three-way solenoid valves (39a, 39b) controlled by the electronic control unit (40) to alternately supply the high-pressure fluid to the two supply ports (33a, 33b) of the double-acting cylinder (32).

4. The fluid plant according to claim 1, comprising the at least one multiway distribution valve (42, 44) movable between a position (Position1) for supplying the double-acting cylinder (32) with the high-pressure fluid taken upstream of the expansion system (18) and a position (Position2) for injecting the low-pressure fluid exiting said double-acting cylinder (32) downstream of the expansion system (18), said position of the distribution valve (42, 44) being controlled by the electronic control unit (40) to alternately supply the high-pressure fluid to the two supply ports (33a, 33b) of the double-acting cylinder (32).

5. The fluid plant according to claim 4, wherein the at least one multiway valve is two multiway distribution valves (42, 44).

6. The fluid plant according to claim 1, wherein the double-acting cylinder (32) comprises a cylindrical cylinder casing (32a) delimiting an internal volume and a piston (32b) movable in translation in said cylindrical cylinder casing (32a) and separating the internal volume into two isolated chambers (32c, 32d), said piston (32b) being secured to a substantially rigid rod (32e) connected to the hydraulic system (34).

7. The fluid plant according to claim 1, wherein the expansion system (18) is configured to allow maintaining a downstream pressure (P2) at a threshold value.

8. The fluid plant according to claim 1, comprising a metering device (20) disposed downstream of the expansion system (18) and upstream of the low-pressure fluid distribution network (14), said metering device (20) being supplied with direct current by the electricity generating system (30).

9. The fluid plant according to claim 8, comprising the high-pressure line (16a) connecting the expansion system (18) to a transport network (12) and the low-pressure line (16b) connecting the expansion system (18) to the metering device (20).

10. The fluid plant according to claim 9, wherein the electricity generating system (30) is connected to the high-pressure line (16a) and to the low-pressure line (16b).

11. The fluid plant according to claim 1, wherein said plant is a natural gas delivery plant.

12. A natural gas installation (10) comprising a transport network (12), a distribution network (14) receiving the low-pressure natural gas and the natural gas plant (16) according to claim 1, connecting the transport network (12) to the distribution network (14).

\* \* \* \* \*